Nov. 18, 1958      R. G. ALLEN      2,860,524
ADJUSTING MECHANISM FOR TIMING DEVICES
Filed Feb. 17, 1954      3 Sheets-Sheet 1
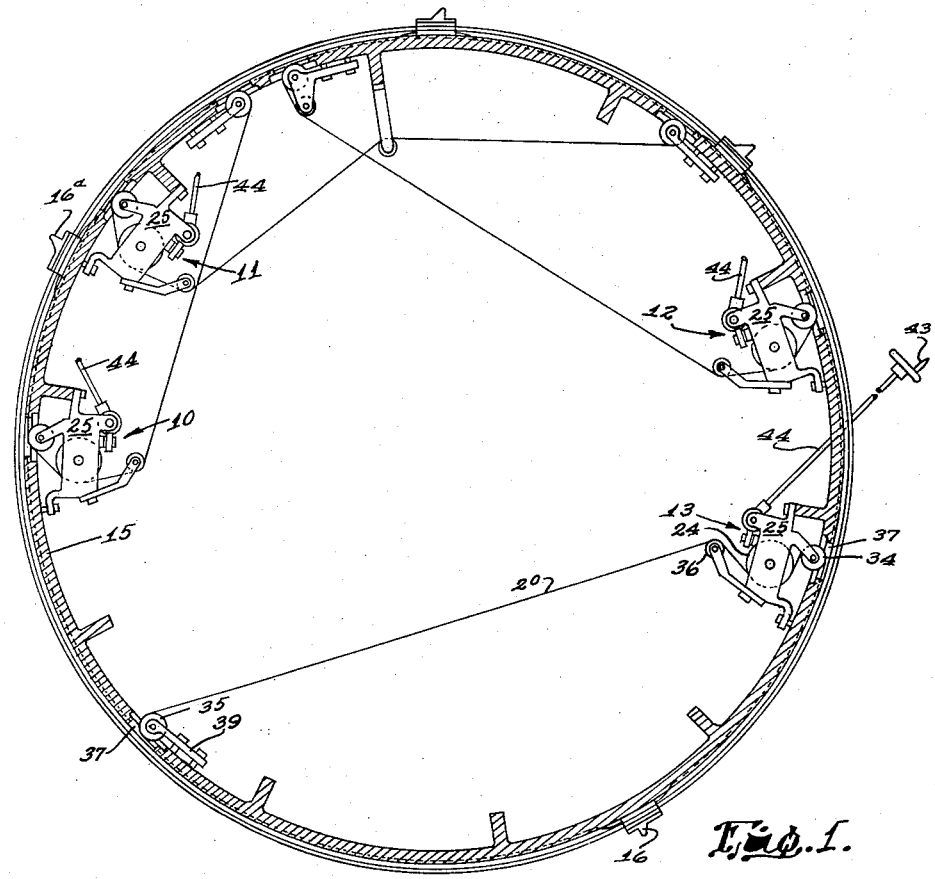
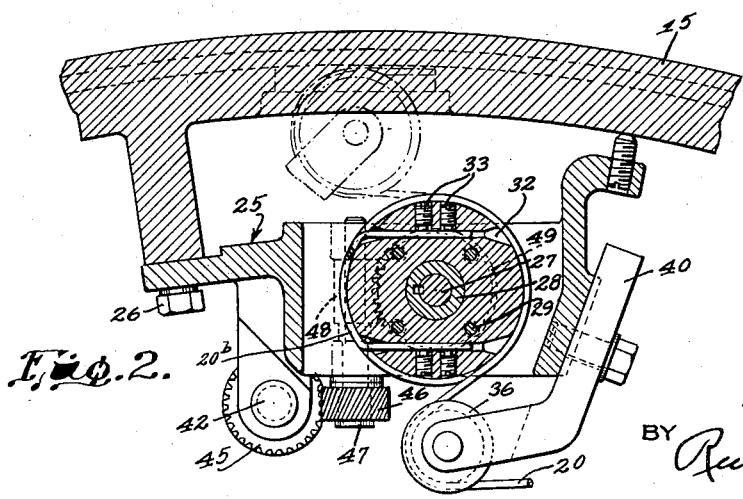
INVENTOR
RUSSELL G. ALLEN
BY *Rule and Hoge.*
ATTORNEYS

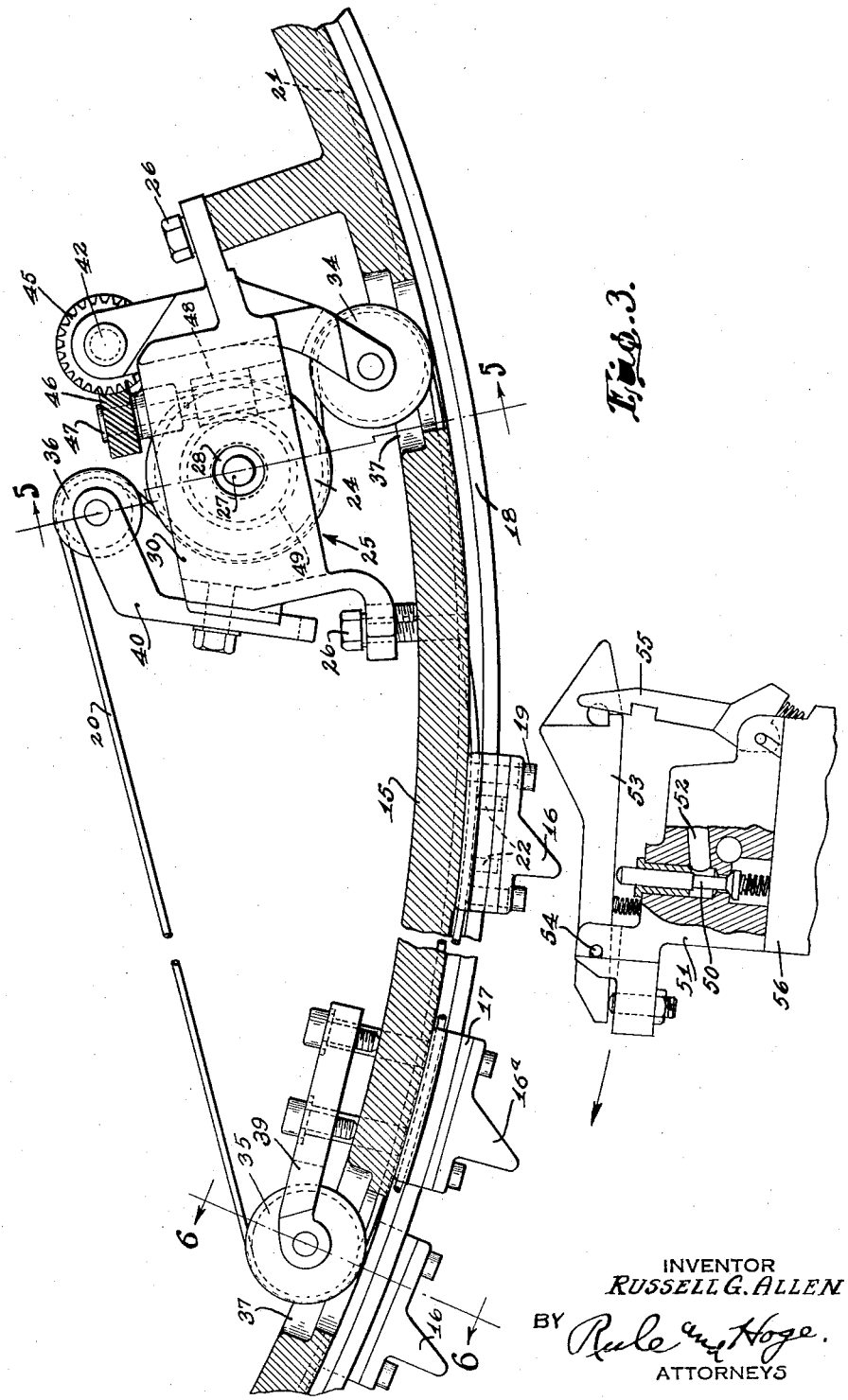

Nov. 18, 1958    R. G. ALLEN    2,860,524
ADJUSTING MECHANISM FOR TIMING DEVICES
Filed Feb. 17, 1954    3 Sheets-Sheet 3
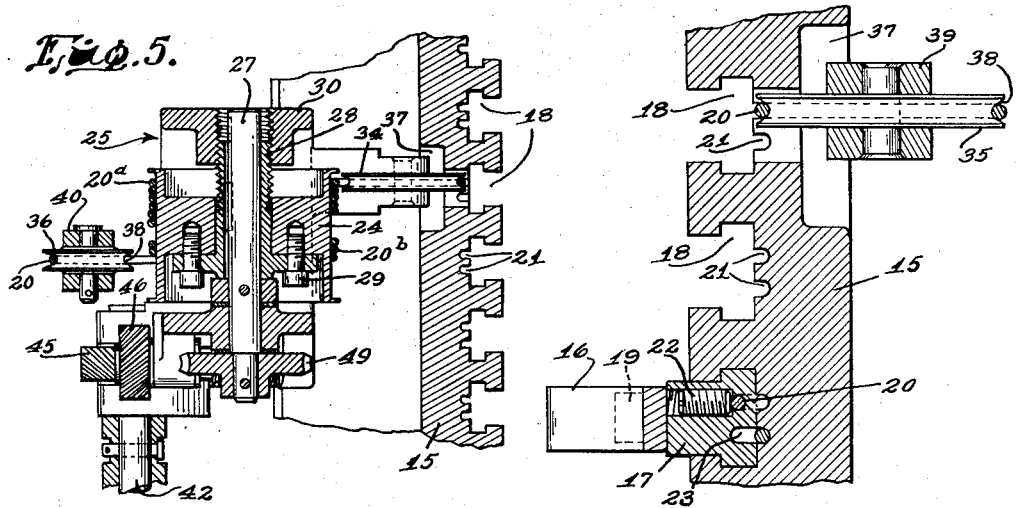
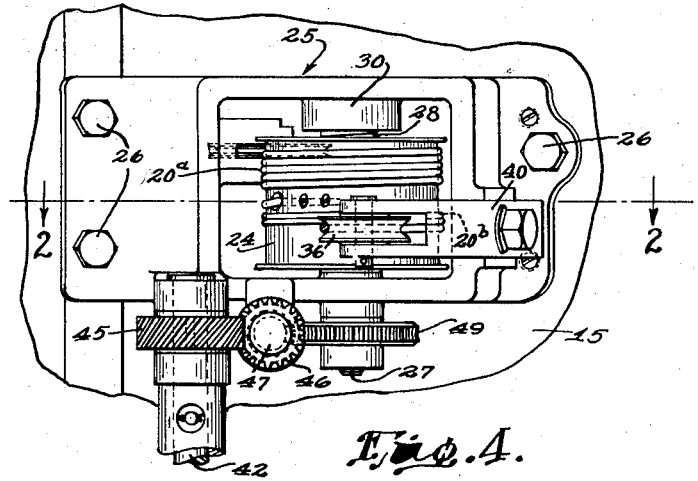
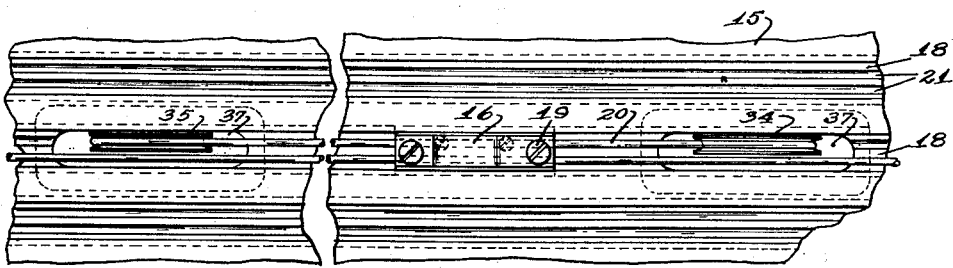
INVENTOR
RUSSELL G. ALLEN
BY
ATTORNEYS United States Patent Office 2,860,524
Patented Nov. 18, 1958

2,860,524

ADJUSTING MECHANISM FOR TIMING DEVICES

Russell G. Allen, Godfrey, Ill., assignor to Owens-Illinois Glass Company, a corporation of Ohio Application February 17, 1954, Serial No. 410,860

17 Claims. (Cl. 74—505)

My invention relates to apparatus for adjusting the positions of timing or control devices which initiate or control the operations of various parts of an automatic machine, and thereby variably adjusting the timing of such operations individually.

As herein described and illustrated the invention is adapted for use with, or as forming a part of, an automatic glass blowing machine for blowing bottles, jars or other articles, but may have a much wider field of use. One type of such a machine comprises a carriage rotatable continuously about the vertical axis of a stationary drum and a multiplicity of individual heads or units on the carriage. Each unit functions as an article forming machine in itself and during a complete rotation of the carriage, performs the series of operations required to produce a blown article. Air motors mounted to rotate with the carriage and forming part of the units, effect such operations in succession. Control devices on the stationary drum control such operations of the air motors and are adjustable circumferentially of the drum to adjustably vary the timing of such operations.

The control devices on the drum are inaccessible while the machine is running and a primary object of the present invention is to provide adjusting means by which they are individually adjustable while the machine is in operation. In the form herein illustrated the control devices comprise cams mounted for sliding movement along grooves or tracks extending circumferentially of the drum. Cables wound on reels within the drum are connected to the control devices. The reels are rotated manually through gear trains extending to convenient positions outside of the drum, for adjusting the control devices.

Referring to the accompanying drawings which illustrate a preferred form of the invention:

Fig. 1 is a sectional plan view, partly diagrammatic, of the stationary machine drum and the adjusting devices mounted therein;

Fig. 2 is a sectional plan view on a larger scale of a portion of an adjusting unit, the section being at the line 2—2 on Fig. 4;

Fig. 3 is a fragmentary part-sectional plan view of the drum and an adjusting unit mounted therein;

Fig. 4 is an elevational view of an adjusting unit;

Fig. 5 is a vertical section at the line 5—5 on Fig. 3;

Fig. 6 is a section at the line 6—6 on Fig. 3; and

Fig. 7 is a fragmentary elevational view of a portion of the exterior surface of the drum with a cam adjustably mounted thereon.

Referring to Fig. 1, a plurality of adjusting mechanisms or units 10, 11, 12 and 13 are mounted on the inner face of a stationary cylindrical drum 15. The drum may form a part of the center column of a glass blowing machine for blowing hollow ware such as bottles and jars. The machine comprises a carriage which is rotated continuously about the vertical axis of the drum and carries a plurality of heads or units exterior to the drum and spaced circumferentially thereof. Each such head or unit includes a number of elements or mechanisms which are operated in succession in forming the glass articles. The several operations are effected by air motors mounted to rotate with the carrier. The operations of the air motors are initiated and controlled by the control devices herein shown as cams 16. These control devices which serve as timers to determine the time, during the rotation of the machine carriage, at which each of the several air motors is operated, may be in the form of cams, lugs or other contact devices projecting into the path of the cooperating elements on the rotating carriage which are to be actuated thereby.

Each cam 16 is mounted on a slide 17 which is slidably mounted for adjustment circumferentially of the drum 15 in a cam track or groove 18 formed in the exterior surface of the drum and preferably extending the entire circumference of the drum. A multiplicity of these tracks or grooves 18 are arranged in vertically spaced relation (Fig. 5) to accommodate the necessary or desired number of cams 16. The cams are removably attached to the slides 17 by screw bolts 19. The cams are adjusted manually along their tracks by means including cables 20 individual to the cams. Each of the tracks 18 is formed with small grooves 21 to receive portions of the cables 20. Each cable extends through a bore formed in the associated slide 17 and is gripped by clamping screws 22 (Fig. 6) in the slide. A groove 23 in the slide 17 provides clearance for the cable in the adjoining groove 21.

Each adjusting unit includes a reel 24 comprising a cable drum on which the end portions of the cable 20 are wound in opposite directions and in which the ends of the cable are clamped. The ends of the cable extend through openings 32 in the reel (Fig. 2) and are held by clamping screws 33. The reel 24 is journaled for rotation in a frame 25 mounted within the drum 15 and held in adjusted position therein by bolts 26.

Referring to Fig. 5, the reel 24 is mounted on a vertical drive shaft 27 which is rotatable manually as hereinafter described for rotating the reel. A tubular shaft 28, splined on the drive shaft 27, is attached to the reel 24 by screw bolts 29. The sleeve 28 is formed on its outer surface with a screwthread or spiral which engages a corresponding spiral groove in a bearing head 30 which forms an integral part of the frame 25. It will be seen that with this construction, rotation of the shaft 27 will cause a spiral rotating movement of the reel 24. The spiral movement serves to layer wind the cable when the reel is rotated, the pitch of the spiral groove in the head 30 being such that the cable is closely wound in a single layer on the reel.

As shown in Fig. 3 the cable 20 is trained over sheaves 34, 35 and 36. The sheaves 34 and 35 extend through openings 37 in the wall of the drum 15, the sheaves being in register with or at the level of the corresponding tracks 18 (Fig. 6) with the peripheries of the sheaves substantially tangent to the inner wall surfaces of said tracks and with the grooves 38 of the sheaves in register with the grooves 21. The sheave 34 is mounted on the frame 25. The sheave 35 is journaled in an arm 39 adjustably mounted within the drum for aligning the sheave with the grooves in the drum. The sheave 34 (as shown in Fig. 5) is lined up with upper cable groove 21 in a particular cam groove 18 and the sheave 35 is mounted to line up with the same groove 21. The sheave 36 is carried on a take up arm 40 adjustably mounted on frame 25 and is in proper relation to reel 24 for aligning the cable. The cable 20 extending between sheaves 35 and 36 will have a slight angle up or down as case may be. Each of the tracks 18 is formed with two cable grooves. This permits a cam 16 with its attached slide 17 to be positioned in and adjusted along an arc of the drum occupied by a cable extending along the same arc and connected to another cam 16. Thus, as shown in the lower cam tracks 18 in Fig. 6, the two cables, connected to separate cams 16, are in overlapping relation. Also as shown in Fig. 7, the cable 20 connected to the cam 16 runs in the same track 18 as the cable therebeneath which passes behind this cam but is not connected thereto.

The means for rotating the cable drum 24 includes a manually operated drive shaft 42 (Figs. 4 and 5) extending downward from the frame 25. This shaft is operatively connected to a hand crank located at any convenient position. As shown in Fig. 1 a hand crank 43 is attached to a horizontal shaft 44 operatively connected to the shaft 42. A train of gearing connecting the shaft 42 to the shaft 27 of the reel includes intermeshing helical gears 45 and 46 keyed respectively to the shaft 42 and a horizontal shaft 47. A worm 48 on the shaft 47 meshes with a worm gear 49 keyed to the shaft 27.

When the hand crank is rotated in one direction it operates through the gearing just described to rotate the reel 24 in a corresponding direction, and thereby wind the cable 20 in an upper layer or coil 20ᵃ, the reel being moved spirally downward at the same rate as the layer 20ᵃ is built upward on the reel, as heretofore described, for maintaining the cable in register with the sheave 34. During this rotation the lower coil 20ᵇ of the cable is being payed out and runs over the adjoining sheave 36, the cable being maintained in register with said sheave by the downward spiral movement of the reel. The cam 16 or other control device attached to the cable, is thus adjusted along the track 18 to any desired position.

In the particular machine above referred to, the cams 16 serve to control the operations of air motors on the machine carriage. One of the control mechanisms is shown in Fig. 3 and comprises a valve 50 mounted in a head 51 on the rotating carriage 56 and operable to open and close a port 52 through which air under pressure is supplied for actuating the air motor when the valve is opened by an arm 53 pivoted at 54. The cam 16 for operating the arm extends into the path of the arm so that as the carriage 56 rotates, the valve 50 is opened when it reaches a position determined by the position to which the cam 16 has been adjusted. A latch 55 locks the arm 53 in its operated position, and may be released by a cam 16ᵃ which extends into the path of the latch.

Modifications may be resorted to within the spirit and scope of my invention.

I claim:

1. The combination of a cylindrical drum, said drum having a track extending circumferentially thereof on the exterior surface of the drum, an actuating device mounted for movement along the track, adjusting means mounted within the drum, said adjusting means including a reel mounted within the drum, a cable connected to the reel, means for rotating the reel, and means for attaching the cable to said actuating device.

2. The combination of a drum having an exterior cylindrical surface and a track extending along said surface circumferentially of the drum in a plane perpendicular to the axis of the drum, an actuating device mounted for movement along said track, means for adjusting the position of said actuating device along the track, said adjusting means including a reel mounted within the drum, a cable attached to the reel, said cable extending from the reel to said track in said plane and along said track and through openings formed in the wall of the drum, means for attaching the cable to the actuating device, and means for rotating the reel and thereby moving the actuating device along said path.

3. The apparatus set forth in claim 2, said apparatus including sheaves over which the cable is trained, said sheaves lying in said plane and extending into the openings in said drum.

4. The apparatus set forth in claim 2, the cable having end portions wound on the drum in opposite directions.

5. The combination of a cylindrical drum having its axis vertical, a track formed in the exterior peripheral surface of the drum and extending horizontally circumferentially of the drum, an actuating device slidably mounted in said track for adjustment lengthwise of the track, means for moving said device along the track comprising a cable extending along said track, means for attaching the cable to said actuating device, a reel mounted within said drum, said cable having end portions wound on the reel with the ends of the cable attached to the reel, and means for rotating said reel including a manually operable device positioned exteriorly of the drum.

6. The apparatus defined in claim 5, said apparatus including sheaves over which the cable is trained, said sheaves extending into openings formed in the wall of the drum and being in register with that portion of the cable extending along the said track.

7. The apparatus defined in claim 5, said apparatus including means for moving the reel in the direction of its axis during its rotation and thereby layer winding the cable on the reel.

8. The combination of a stationary cylindrical drum formed with a track extending circumferentially of the drum on its outer surface, an actuating device slidably mounted in said track, means for moving said actuating device along the track including adjusting mechanism within the drum, said mechanism comprising a frame, a reel journaled in said frame, a cable having end portions attached to and wound on the reel, guide sheaves over which the cable is trained including sheaves journaled within the drum and extending through openings formed in the wall of the drum, the peripheries of said sheaves being substantially tangent to said track, and manual means for rotating said reel and thereby adjusting said actuating device along the track.

9. The combination with a cylindrical drum mounted with its axis vertical, of an actuating device and adjusting mechanism for adjusting said device, the drum being formed with a track extending circumferentially thereof along its exterior surface, the wall of the drum having openings therethrough at the level of said track, said adjusting mechanism comprising a reel, a frame in which the reel is journaled, means for mounting said frame on the inner wall of the drum, a cable having portions wound in opposite directions on the reel, sheaves over which the cable is trained, said sheaves journaled within the drum and extending into said openings in the wall of the drum, the cable including a length extending between said sheaves and along the said track, a hand crank positioned exteriorly of the drum, and means providing operating connections between the hand crank and the reel for rotating the latter.

10. The apparatus set forth in claim 9, the reel being mounted with its axis vertical, said operating connections including a vertical drive shaft to which the hand crank is operatively connected, and a gear train providing driving connections between said drive shaft and the reel.

11. The apparatus defined in claim 9, the said track being in the form of a groove in the exterior surface of the drum wall, the wall of said groove being formed with a smaller groove in which the cable runs between said sheaves, the sheaves being formed with peripheral grooves at the level of the said smaller groove in the drum wall.

12. The combination of a cylindrical drum mounted with its axis vertical, said drum formed with a multiplicity of tracks extending circumferentially of the drum at different levels, cams individual to said tracks and mounted for sliding movement therein circumferentially of the drum, adjusting mechanisms individual to said cams and mounted within the drum at different positions circumferentially thereof, said mechanisms each comprising a reel, cables connected to said reels, means for guiding the cables along said tracks, said cables being connected to the said cams and means located exteriorly of the drum and operatively connected to the reels for individually rotating the reels and thereby adjusting the cams along said track.

13. The combination set forth in claim 12, a carriage mounted for rotation about the axis of the drum, operating units on the carriage, and means individual to said units and operable to control the operation of the respective units, said means being connected to move with the carriage in paths into which the said cams project and thereby operable by said cams at points during the rotation of the carriage determined by the positions of adjustment of the cams.

14. The combination with an actuating device for actuating an element traveling in a circular path, of a stationary support having an exterior arc shaped supporting surface concentric with said circular path, means for mounting said device for bodily movement along said supporting surface in an arc of a circle concentric with said path to different positions of adjustment along said arc, means for moving said device bodily in said arc comprising a cable attached to said device, means for guiding the cable in an arcuate path substantially coincident with the arc in which said device is moved, and reversible means for driving the cable in either direction.

15. The combination of a drum, an actuating device mounted on the exterior peripheral surface of the drum, a carriage rotatable about the axis of the drum, means on the carriage in position to be engaged by said actuating device during such rotation, and adjusting means for moving said device along said surface during the rotation of the carriage, said adjusting means comprising a reel within the drum and a cable connecting the actuating device to the reel, and means for guiding said actuating device along the exterior cylindrical surface of the drum in a path extending circumferentially of the drum in a plane perpendicular to the axis in the drum.

16. The combination of a cylindrical drum formed with a track extending circumferentially thereof along its exterior surface, a plurality of cams and cam operating assemblies, each assembly including a slide mounted for sliding movement along said track, a cam attached to the slide, an adjusting device comprising a reel, and a cable wound on the reel and attached at its ends to the slide, said cable extending along said track, the track being formed with grooves extending lengthwise thereof, means for guiding the cables of said assemblies in the respective grooves with the cable of one assembly extending between the wall of the drum and the slide of the other said assembly and free for relative movement of the slide and the cable lengthwise of said track.

17. The apparatus defined in claim 16, said track being in the form of a groove within the exterior wall surface of the drum and the cable grooves being formed in the wall of the said track.

References Cited in the file of this patent

UNITED STATES PATENTS

| | | |
|---|---|---|
| 1,460,651 | Hall | July 3, 1923 |
| 1,828,126 | Brown | Oct. 20, 1931 |
| 1,854,555 | Mendola | Apr. 19, 1932 |
| 1,879,294 | Jones et al. | Sept. 27, 1932 |
| 2,272,237 | Brown et al. | Feb. 10, 1942 |
| 2,354,029 | Kingston | July 18, 1944 |
| 2,786,361 | Russell | Mar. 26, 1957 |

FOREIGN PATENTS

| | | |
|---|---|---|
| 497,749 | Great Britain | Dec. 28, 1938 |